C. R. MACAULEY.
PROCESS OF PRODUCING MOTION PICTURE ILLUSION.
APPLICATION FILED JUNE 12, 1915.
1,175,281.  Patented Mar. 14, 1916.
Fig. 1.
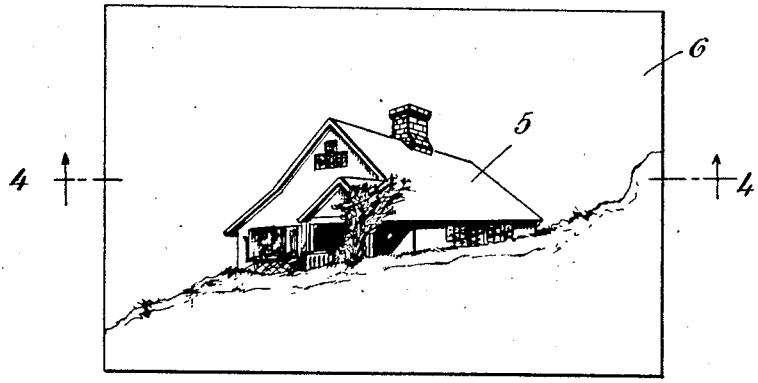
Fig. 2.
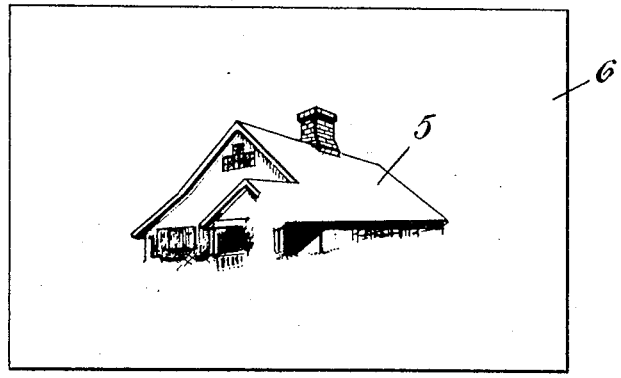
Fig. 3.
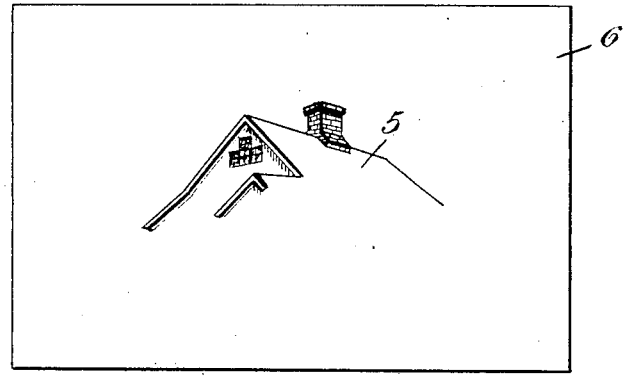
Fig. 4.
Charles R. Macauley
Inventor
By his Attorney

UNITED STATES PATENT OFFICE.

CHARLES R. MACAULEY, OF NEW YORK, N. Y.

PROCESS OF PRODUCING MOTION-PICTURE ILLUSION.

1,175,281. Specification of Letters Patent. Patented Mar. 14, 1916.

Application filed June 12, 1915. Serial No. 33,668.

*To all whom it may concern:*

Be it known that I, CHARLES R. MACAULEY, a citizen of the United States, and a resident of New York city, in the county of New York and State of New York, have invented certain new and useful Improvements in Processes of Producing Motion-Picture Illusion, of which the following is a specification.

My invention relates to the production of an illusion upon a moving picture screen of the actual drawing of a picture and refers particularly to a method whereby this illusion may be produced quickly, economically and accurately.

One object of my invention is the production of an accurate illusion of the actual drawing of a design or picture upon a moving picture screen.

Another object of my invention is a process whereby a series of images representing the various stages of a drawing of a picture may be made upon a moving picture film.

Another object of my invention is a process for producing the illusion of an actual drawing of a picture without the destruction or obliteration of the original drawing.

Another object of my invention is a process for producing the illusion of an actual drawing of a picture or design in which the obliteration of the lines of the original drawing is not accompanied by a crinking or twisting of the paper upon which the drawing is made, nor a distortion of the lines of the drawing.

Another object of my invention is a process for the production of the illusion of the actual drawing of a picture or design in which the obliteration of the lines of the picture may be accomplished much more rapidly, readily and accurately than in the present known processes.

Other objects of my invention are apparent upon a consideration of the specification and claims.

The apparent drawing of a picture or design upon a moving picture screen seemingly by the hand of the artist himself has become one of the greatest value to the moving picture producers and of the greatest interest to the public, and numerous attempts have been made to produce these pictures accurately and cheaply. The method usually employed consists in directing the moving picture camera carrying the sensitized film at a sheet of paper, properly illuminated, the artist then drawing the picture in a photographable medium over lines previously made with a medium which is apparent to the eye but which is not photographable. This method necessitates the presence of the artist before the camera and requires him to draw the picture twice, once in a non-photographable medium and once in a photographable medium, and as the latter must be done while the film is moving, the greatest skill and care are necessary to produce the lines of the drawing or picture sufficiently rapidly and accurately. I have proposed a method whereby many of these difficulties may be overcome which consists in the artist preparing the completed picture in a photographable medium prior to its exposure to the camera, thus allowing him to make a more perfect and artistic production. This picture is then exposed to the moving sensitized film in a moving picture camera, the photographable lines of the picture being successively eliminated by the application of a non-photographable medium which is applied to the drawing by means of a pen, brush or other similar device. The negative thus formed will carry images showing the successive disappearances of the lines of the picture and if the positive from this negative is projected upon a screen in the reverse direction from that in which it was taken, the picture will apparently be drawn upon the screen.

I have found that while satisfactory results can be obtained by the above described process, considerable care must be exercised in the application of the process.

I have now found a method whereby the above described process may be greatly improved, by which the results are much more certain and in which the carrying out of the process may be greatly facilitated. When a picture is drawn with ink, crayon, etc., upon cardboard or paper, that portion of the cardboard or paper covered by the drawing medium becomes less absorbent than the other portions of the paper, and hence when a non-photographable liquid or paste medium is applied to the lines of the drawing, there is a decided tendency for the liquid or paste to be drawn away from the lines of the drawing to the paper on each side thereof, due to the stronger absorbent power of the unlined paper. This results in the lines not being completely covered by the non-photographable medium, allowing of their imprint upon the film and in a banking up of the non-photographable medium upon each side of the line, causing ridges which are liable to form shadows showing in the projected images upon the screen. In addition, the moisture in the paste or liquid has a tendency to crinkle and warp the paper, which shows upon the projected images and also causes a distortion of the lines of the drawing. I have found that these difficulties may be readily and completely overcome by placing a thin sheet of a perfectly transparent substance, such as glass, over the drawing and applying the non-photographable opaque medium upon the upper surface of this transparent material and over the photographable lines of the drawing in order to prevent their impression upon the film. By this process the operation can be carried out much more rapidly and without the dangers pointed out as incident to the older method.

In following my invention, a picture previously prepared in a photographable medium is covered with a thin piece of glass, or other similar transparent material, and then exposed, properly illuminated, to a moving sensitized film in a moving picture camera. During the passage of the film, an opaque non-photographable medium is applied to the glass so as to successively cover the lines of the drawing and prevent their impression upon the film. When a positive is produced from the negative thus made and projected upon a screen in a reverse direction to that in which it was taken, the illusion will be given of the actual drawing of the picture.

In the accompanying drawings which form a part of this application similar parts are designated by similar numerals.

Figure 1 illustrates an original drawing. Fig. 2 illustrates Fig. 1 in which a portion of the drawing has been eliminated by means of a non-photographable medium. Fig. 3 illustrates Fig. 2 in which some of the lines of said figure have been eliminated by a non-photographable medium. Fig. 4 illustrates a cross-section through the line 4—4 of Fig. 1.

In the accompanying drawings Fig. 1 illustrates a drawing 5 upon cardboard 6 covered with a sheet of glass 7. Figs. 2 and 3 show progressive steps of the drawing of Fig. 1 during the gradual elimination of the various lines of the drawing by means of a non-photographable opaque substance placed upon the glass 7 and obliterating or rendering non-photographable the lines thus covered.

It is evident that during the formation of the photographic film by the process in which the non-photographable medium is applied directly to the drawing, the drawing is destroyed during this formation and hence if by any accident the photographable film is unsatisfactory, a new drawing must be made if a new film is desired. By the process of my invention, however, the drawing is not destroyed or injured but is retained in its original position and hence can be reused for the production of as many photographable films as desired, a feature of the greatest commercial value.

I do not limit myself to the particular transparent mediums described herein nor to the particular manner of applying the non-photographable opaque medium, nor to the particular non-photographable material thus applied, all of which may be varied without going beyond the scope of my invention as described and claimed.

What is claimed, is:

1. A method of making a photographic film comprising producing upon a sensitized film a series of images of a photographable drawing by successively rendering the photographable lines of the drawing non-photographable by concealing them with an opaque non-photographable medium applied to a transparent surface other than the material upon which the drawing is produced, the transparent medium being situated so as to cover the drawing.

2. A process of making a photographic film comprising producing upon a sensitized film a series of images of a photographable drawing by exposing the drawing to a moving picture camera and successively eliminating the photographable lines of the drawing by rendering them non-photographable by means of an opaque medium upon a transparent material interposed between the lines of the drawing and the camera.

3. A process of making a photographic film comprising exposing a photographable line drawing to a sensitized film in a moving picture camera and successively rendering the photographable lines of the drawing non-photographable by concealing them with an opaque medium applied to a transparent surface other than the material upon which the drawing is produced, the transparent medium being situated so as to cover the drawing, said treatment being applied during the passage and exposure of the film.

4. A process of making a photographic film comprising exposing a photographable line drawing to a sensitized film in a moving picture camera and successively rendering the photographable lines of the drawing non-photographable by concealing them with an opaque medium applied to a transparent surface other than the material upon which the drawing is produced, the transparent medium being situated so as to cover the drawing, said treatment being applied during the passage and intermittent exposure of the film, said opaque medium being applied to a transparent material by means of an instrument held in a human hand in such a manner that the images upon the film will give the semblance of a reversed appearance of the making of the drawing.

5. A process of making a photographic film comprising covering a photographable drawing with a sheet of transparent material, exposing the drawing, properly lighted, to a sensitized film within a moving picture camera and rendering the photographable lines of the drawing non-photographable by interposing a layer of an opaque non-photographable medium between the lines of the drawing and the camera upon the transparent material during the passage of the sensitized film.

6. A process of making a photographic film comprising covering a photographable drawing with a sheet of glass, exposing the drawing, properly lighted, to a sensitized film within a moving picture camera and rendering the photographable lines of the drawing non-photographable by interposing a layer of an opaque non-photographable medium between the lines of the drawing and the camera upon the glass during the passage of the sensitized film.

7. A method of presenting the illusion of a drawing of a picture by producing a negative by photographing upon a sensitized film in a moving picture camera, a series of images obtained by subjecting a completed drawing to said camera during the passage of the sensitized film and successively rendering the photographable lines of the drawing non-photographable by concealing them with an opaque non-photographable medium applied to a transparent surface other than the material upon which the drawings are produced, the transparent medium being situated so as to cover the drawing, preparing a positive film from the negative and projecting the series of images upon said positive in a reversed direction to that in which they were taken.

8. A method of presenting the illusion of a drawing of a picture by producing a negative by photographing upon a sensitized film in a moving picture camera, a series of images obtained by subjecting a completed drawing to said camera during the passage of the sensitized film and successively rendering the photographable lines of the drawing non-photographable by concealing them with an opaque non-photographable medium applied to a sheet of glass interposed between the drawing and the camera, preparing a positive film from the negative and projecting the series of images upon said positive in a reversed direction to that in which they were taken.

Signed at New York city, in the county of New York and State of New York, this 11th day of June, 1915.

CHARLES R. MACAULEY.

Witnesses:
TERESA V. LYNCH,
RITA LYNCH.